June 22, 1943.                F. R. HENSEL                 2,322,691
                         WELDING ELECTRODE HOLDER
                           Filed Aug. 4, 1942

INVENTOR.
Franz R. Hensel
BY
Robbin & Carlson
ATTORNEYS

Patented June 22, 1943

2,322,691

UNITED STATES PATENT OFFICE 2,322,691

WELDING ELECTRODE HOLDER

Franz R. Hensel, Indianapolis, Ind., assignor to P. R. Mallory & Co., Inc., Indianapolis, Ind., a corporation of Delaware Application August 4, 1942, Serial No. 453,523

7 Claims. (Cl. 219—4)

This invention relates to welding electrode holders.

An object of the invention is to improve welding electrode holders and the sealing means therefor.

Other objects of the invention will be apparent from the description and claims.

The present invention contemplates a collet type welding electrode holder wherein the welding electrode is clamped by a collet or chuck arrangement. The holder and electrode are provided with internal communicating water cooling passages and a feature of the present invention resides in the water sealing means associated with the collect construction for preventing leakage between the electrode and holder. In its preferred form the water seal comprises an annular ridge or knife edge which engages the welding electrode.

There are several advantages in the use of a collet type of holder.

(1) A very short electrode can be used, which is of particular importance at the present time, where there is a shortage of copper.

(2) The electrode can be made of cylindrical rod stock without a taper or without threads, thereby saving considerable material.

(3) The electrodes can be used up almost completely. Previously only a small part of the electrode was useful and after the tip had worn or mushroomed to a certain extent, it had to be scrapped, causing a considerable amount of material loss.

(4) The manufacture of suitable electrodes from rod stock is very much simplified, since the operations can be reduced to a cutting off from the proper diameter rod and extruding the water cooling hole. No tapered end or threads need be cut.

(5) This type of fixture is much better suited to clamp large pieces, where a Morse taper or a screw fit are impractical.

(6) The electrode rests on the barrel of the holder and therefore the pressure applied during the welding operation is taken up uniformly. In the tapered electrodes heretofore used the electrode pressure had a tendency to press the electrode very tightly into the tapered socket, thereby enlarging or damaging the taper and ultimately making the holder useless. The same thing happened when a threaded electrode was used, in which case excess pressure would ruin the threads.

Figure 1:
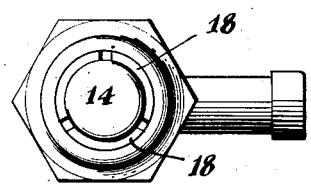
Figure 1 is an end view of a welding electrode and holder therefor embodying features of the present invention.
Figure 2:
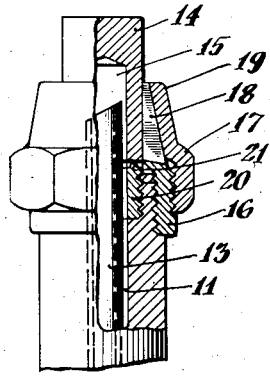
Figure 2 is a side view partly in section of the holder and electrode.

Referring to the drawing the welding electrode holder illustrated in Figures 1 and 2 comprises a barrel 10 having a longitudinal water cooling passage 11 extending therethrough and provided with a water supply head 12 having connections thereon for water supply and return tubes. A tube 13 connected to the water supply inlet extends through the middle of passage 11 to carry cooling water inside the water recess of the welding electrode 14 which is held by the end of the holder.

Welding electrode 14, sometimes called the welding tip, comprises a cylindrical body of high conductivity metal, such as copper, silver or their alloys having a recess 15 extending therein from the rear end thereof for accommodating cooling water.

The electrode is clamped in the end of the holder by a collet type clamping arrangement comprising a ring member 16 which is screwed onto the end of the barrel 10 and is likewise provided with external threads to accommodate a tightening nut 17 threaded thereon. Ring 16 is notched to provide a series of three or more segments 18 which engage the outer cylindrical surface of electrode 14. When the electrode is inserted in the end of the holder clamping nut 17 is screwed down so that its conically tapered portion 19 forces segments 18 tightly against the wall of the electrode to securely clamp it in place.

The water seal means comprises a threaded ring member 20, preferably formed of a hard metal such as hardened steel. Ring 20 is screwed into an enlarged end of passage 11 in barrel 10. The ring is provided on its outer edge with an annular ridge or knife edge 21 which engages the rear end of electrode 14 when it is held in the holder. Since the metal of electrode 14 is somewhat softer, the edge 21 will sink into the electrode slightly to form an efficient water seal. This is aided by the pressure applied to the welding electrode during welding.

Figure 3:
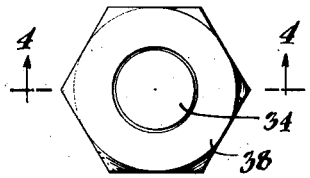
Figure 3 is an end view of a modified holder and electrode.
Figure 4:
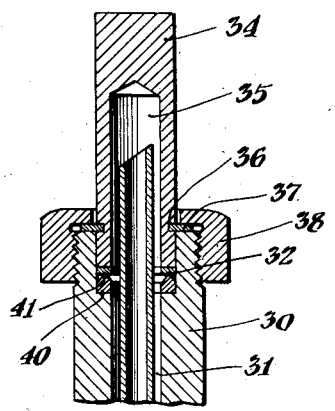
Figure 4 is a longitudinal section on the line 4—4 of Figure 3.

In the modified arrangement illustrated in Figures 3 and 4 the electrode 34 comprises a cylindrical recessed piece of high conductivity metal having, near its rear end, an annular groove 36 in which is fitted a clinch ring 37 of steel or other tough metal. The electrode has a water recess 35 and is coated at its rear and surrounding the water recess with an annular coating 32 of soft metal such as lead, tin, cadmium or other soft metal. This may be applied by electroplating, metal fusion, or by welding or brazing a ring of soft metal thereto.

The holder barrel 30 has a water passage 31 therein which is enlarged at its outer end and has a hardened steel ring 40 brazed or shrunk into the base of the enlarged portion. Ring 40 has an annular ridge or knife edge 41 thereof facing toward the end of the holder. A clamping nut 38 is threaded onto the end of barrel 30. When the electrode 34 is inserted in the end of the holder with its rear end, carrying soft metal coating 32 against ridge 41, nut 38 is placed over the end of the barrel and screwed down to apply pressure to clinch ring 37 and thereby draw the electrode tightly against the sealing ridge 41 to effect a water seal.

Figure 5:
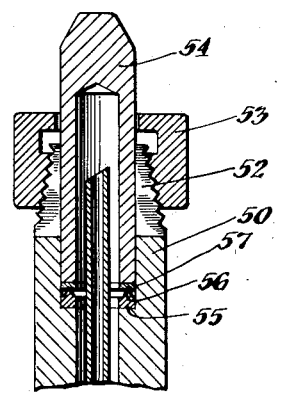
Figure 5 is a longitudinal section through a welding electrode and holder of further modified construction.

In Figure 5 the barrel 50 of the holder is notched at its end to provide a series of segments 52. The outer surface of the segments is provided with a threaded taper upon which is screwed a nut 53 having a tapered threaded portion. By tightening nut 53 the segments 52 are tightly pressed against electrode 54 to hold it firmly in place in the holder. In this embodiment the water seal comprises an annular steel ring 55 having ridge 56 thereon which engages the rear end of electrode 54. The electrode end is coated with a soft metal 57 as previously described.

While water cooling is described it is obvious that other cooling fluids may likewise be used. Moreover, it is contemplated that the water sealing arrangement may be reversed with the ridge placed on the end of the welding electrode instead of in the electrode holder.

While specific embodiments of the invention have been described, it is intended to cover the invention broadly within the spirit and scope of the appended claims.

What is claimed is:

1. A welding electrode holder comprising a barrel having a longitudinal fluid passage emerging at one end, a sharp annular ridge on said end surrounding said passage, and a welding electrode clamp for holding an electrode against said ridge on said end, whereby said ridge will make electric contact and form a water seal with said electrode.

2. A welding electrode holder comprising a barrel having a longitudinal fluid passage emerging at one end, a sharp annular ridge on said end surrounding said passage, and a collet-type welding electrode clamp on said barrel for holding an electrode against said ridge on said end in alignment therewith, whereby said ridge will make electric contact and form a water seal with said electrode.

3. A welding electrode holder comprising a barrel having a fluid passage extending longitudinally therethrough, a clamp on one end of said barrel for holding a welding electrode thereon with said electrode closing the fluid passage emerging from said end, and an annular ridge of hard material on said end surrounding said fluid passage and adapted to bite into said electrode when said electrode is pressed toward said barrel.

4. A welding electrode holder adapted for carrying cooling fluid into direct contact with a welding electrode held thereby, said holder comprising a body having at least one fluid passage therein, a clamp thereon for clamping a welding electrode thereto, a fluid passage in said body having an opening for communicating with the electrode, and a fluid seal surrounding the outlet of said fluid passage comprising an annular ridge on said body around said opening and projecting outward to engage the electrode.

5. In combination, a welding electrode holder and an electrode held thereby, said holder comprising a hollow barrel having a fluid passage emerging at one end, a collet-type clamp on said end and a rod-like welding electrode held therein in substantial alignment with said barrel and abutting the end of said barrel around the edge of said fluid passage, one of said abutting ends having a sharp annular ridge of hard metal thereon and the other having a layer of soft metal bonded thereto, whereby longitudinal pressure urging said electrode and holder together will cause said ridge to bite into said soft metal and maintain a fluid seal around the edge of said fluid passage.

6. In combination, a welding electrode holder and an electrode held thereby, said holder comprising a hollow barrel having a fluid passage emerging at one end, a collet-type clamp on said end and a rod-like welding electrode held therein in substantial alignment with said barrel and abutting the end of said barrel around the edge of said fluid passage, one of said abutting parts having an annular ridge of hard metal thereon.

7. In combination, a welding electrode holder and an electrode held thereby, said holder comprising a hollow barrel having a fluid passage emerging at one end, a collet-type clamp on said end and a rod-like welding electrode held therein in substantial alignment with said barrel and abutting the end of said barrel around the edge of said fluid passage, one of said abutting parts having an annular ridge or hard metal thereon, the other of said parts having its abutting end formed of soft metal.

FRANZ R. HENSEL.